Oct. 1, 1968  S. E. MILLER  3,403,956
THERMAL GASEOUS ELECTROMAGNETIC TRANSMISSION DEVICES
Filed May 17, 1965  2 Sheets-Sheet 1
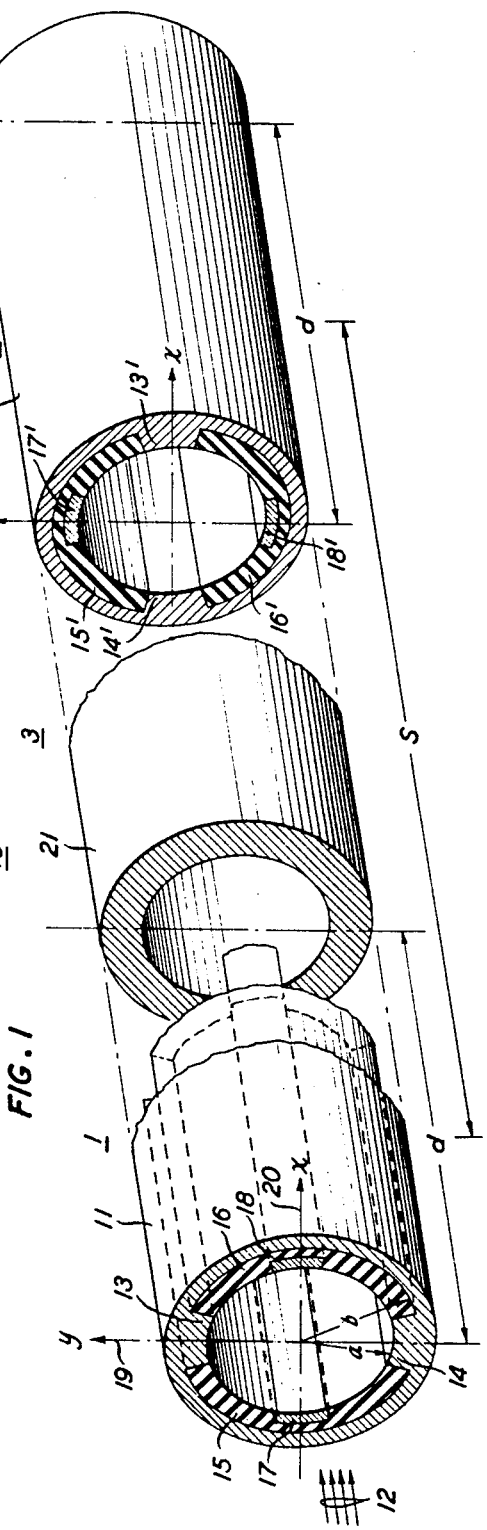
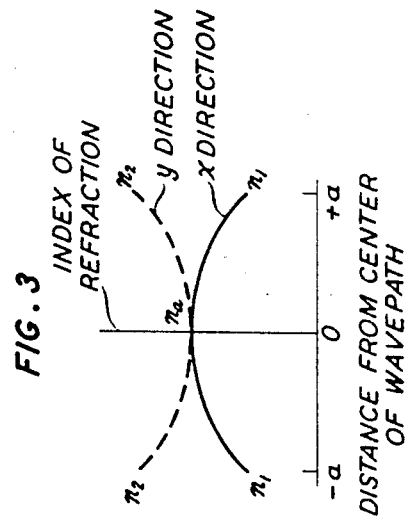
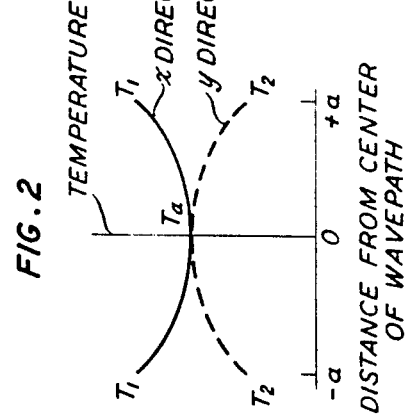
INVENTOR
S. E. MILLER
BY
*Sylvan Sherman*
ATTORNEY

United States Patent Office 3,403,956
Patented Oct. 1, 1968

3,403,956
THERMAL GASEOUS ELECTROMAGNETIC TRANSMISSION DEVICES
Stewart E. Miller, Middletown, N.J., assignor to Bell Telephone Laboratories, Incorporated, New York, N.Y., a corporation of New York
Filed May 17, 1965, Ser. No. 456,342
7 Claims. (Cl. 350—179)

ABSTRACT OF THE DISCLOSURE

This application describes an electromagnetic wave guidance system employing thermal gaseous lenses. In a first illustrative embodiment guidance is obtained by means of a plurality of separate lenses longitudinally distributed along the wavepath. Each lens includes four temperature control elements, symmetrically distributed about the inside of a section of hollow cylindrical tubing. The desired temperature gradients are established in the gas flowing through the tubing by independently controlling the temperature of the four temperature control elements. In a second embodiment of the invention continuous focusing action is realized by making the temperature control elements in the form of longitudinally extending helical members which protrude into the tubing to impart a helical motion to the gas. The helical configuration also reduces distortion in the guidance system due to gravitational effects.

---

This invention relates to thermal gaseous wave transmission devices.

In the copending applications by D. W. Berreman, Ser. No. 347,166, filed Feb. 25, 1964; Ser. No. 385,739, filed July 28, 1964; Ser. No. 402,170, filed Oct. 7, 1964, now United States Patent 3,355,235, issued Nov. 28, 1967; D. W. Berreman and S. E. Miller, Ser. No. 379,175, filed June 30, 1964; by K. B. McAfee, Jr., Ser. No. 357,424, filed Apr. 6, 1964; and by G. E. Conklin, Ser. No. 397,678, filed Sept. 21, 1964, all of which are assigned to applicant's assignee, there are described various types of gaseous lenses and gaseous transmission media particularly adapted for the transmission of optical wave energy. It is a characteristic of the devices described in the above-mentioned copending applications that a thermal gradient is established across the wavepath as a means for guiding optical wave energy propagating therethrough.

More particularly, in the above-mentioned copending application by Berreman and Miller, and in the article entitled "Alternating-Gradient Focusing and Related Properties of Conventional Convergent Lens Focusing," by S. E. Miller, published in the July 1964 issue of the Bell System Technical Journal, pages 1741–1758, it is disclosed that wave energy can be efficiently guided in a transmission system comprising a series of lenses whose focusing properties are alternately convergent and divergent (alternating-gradient focusing).

Typically, in a thermal, alternating-gradient focusing system, the radial temperature gradient across the gas is reversed at regular intervals along the wavepath by alternatively heating and cooling the gas as it flows along the path. In such a system, therefore, separate means for heating and cooling the gas must be provided along the entire length of the transmission line. Recognizing that such wave guidance systems are intended to transmit wave energy over long distances, it becomes apparent that the fabrication of such a transmission line can become a relatively complex and, hence, expensive operation.

It is, accordingly, the broad object of this invention, to provide a relatively simpler means of constructing a thermal gaseous transmission line.

In accordance with the invention, radial temeprature gradients are established across the wavepath by means of longitudinally-extending temperature control elements. The control elements are symmetrically distributed about the periphery of the wavepath, and their temperatures adjusted so as to establish a radially increasing temperature gradient within the gas along a first direction and, simultaneously, to establish a radially decreasing temperature gradient within the gas along a second direction perpendicular to the first direction.

In a first specific illustrative embodiment of the invention, wave guidance is obtained by means of a plurality of separate thermal gaseous lenses, longitudinally distributed along the wavepath. Each lens includes four temperature control elements, symmetrically distributed about the inside of a section of hollow cylindrical tube. The above-described thermal gradients are established in the gas by raising the temeprature of two of the elements, located on diametrically opposite sides of the wavepath, relative to the temperature of the other two diametrically disposed elements. The resulting temperature gradients produced across the gas in the two directions defined by the two pairs of control elements cause convergent lens action along one of the directions, and divergent lens action along the second direction. The focal length of the lens is determined by the temperature difference between control elements and by their lengths.

An alternating-gradient focusing transmission line is obtained by spacing the lenses along the wavepath with adjacent lenses rotated about the longitudinal axis ninety degrees relative to each other.

It is a feature of the invention, that the lenses can be fabricated in long sections by means of a continuous manufacturing process, and then cut into desired lengths.

In the above-described first illustrative embodiment of a transmission path in accordance with the invention, a plurality of discrete thermal lenses are employed. In a second embodiment of the invention, a continuous alternating-gradient focusing transmission path is realized by using helically formed temperature control elements and by imparting a helical motion to the gas as it flows along the wavepath. It is a feature of this second embodiment of the invention that while the thermal gradients along the wavepath change relative to the propagating wave energy in a manner to produce alternating-gradient focusing, the thermal gradients remain substantially constant relative to the gas. In addition, the helical motion simultaneously reduces distortion in the transmission system due to the gravitational effects.

These and other objects and advantages, the nature of the present invention, and its various features, will appear more fully upon consideration of the various illustrative embodiments now to be described in detail in connection with the accompanying drawings, in which:

FIG. 1 is a first illustrative embodiment of the invention employing a plurality of separate thermal lenses;

FIG. 2 shows the transverse thermal gradients established in the gas flowing along the transmission line illustrated in FIG. 1;

FIG. 3 is the corresponding refractive index gradient produced by the temperature gradient illustrated in FIG. 2;

FIG. 5 is a modification of the embodiment of FIG. 4 in which the function of the temperature control elements and the vanes are combined.

Figure 4:
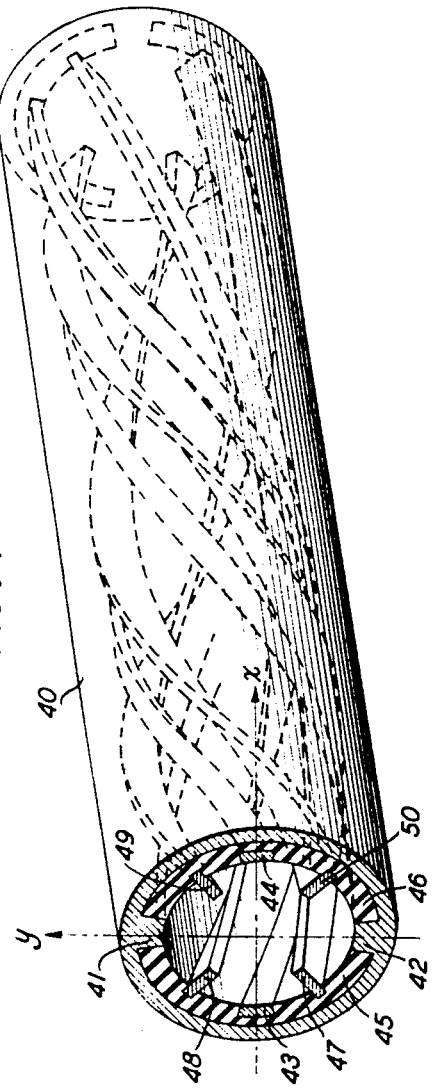
FIG. 4 is a second embodiment of the invention employing helically wound temperature control elements and including vanes for inducing a helical gas flow along the wavepath.

Referring to FIG. 1, there is shown a portion of an electromagnetic wave transmission path 10 comprising two thermal gaseous lenses 1 and 2, separated by a plain section 3 of hollow cylindrical tube 21, through which a gas flow, indicated by arrows 12, has been established. Means for introducing the gas into the system, and regulating its pressure and temperature, including filters, compressors, heating and/or cooling means, all of conventional form, though not shown, are normally included in systems of the type contemplated, as is well known to those skilled in the art.

The first lens 1 comprises a length of hollow cylindrical tube 11 of inside radius $b$ within which there is located a first pair of diametrically disposed temperature control elements 13 and 14. These elements, which extend radially away from the inner surface of tube 11, can either be fabricated as an integral part of the tube, as shown in FIG. 1, or they can be separate members, suitably connected to the inner surface of the tube. As the shape of the temperature control elements is not critical, elements 13 and 14 can have any convenient shape. In the embodiment of FIG. 1, they are segments of a hollow circular cylinder whose outside radius is $b$ and whose inside radius is $a$.

Elements 13 and 14, and tube 11, are advantageously made of heat conducting materials, such as aluminum or copper. Specifically, as will be explained in greater detail hereinbelow, these elements function as heat sinks and are maintained at some specified temperature by virtue of their being connected to tube 11. Means (not shown) are provided for maintaining tube 11 at this specified temperature. These means can comprise no more than just burying tube 11 underground, along with the rest of the transmission path 10, in which case the specified temperature is simply the ambient ground temperature. If large ambient temperature fluctuations are anticipated, then additional heating or cooling means, suitably regulated, may be advantageously provided to maintain a constant ambient temperature in any of the many ways known to those skilled in the art. It should be noted, however, that if a constant amount of heating power is provided, the system is to a large extent self-regulating in that whereas changes in the ambient temperature will change the absolute temperature of the gas, the temperature gradients will remain fairly constant.

The inner surface of tube 11, except for the temperature control elements 13 and 14, is thermally insulated from the gas flowing within the tube by means of heat insulators 15 and 16. These insulators can be made of any suitable heat insulating material, such as one of the available plastics, shaped to conform to the inner surface of tube 11 between elements 13 and 14. In the embodiment illustrated, insulators 15 and 16 are segments of a hollow circular cylinder whose inside radius is $a$ and whose outside radius is $b$.

A second pair of diametrically disposed temperature control elements 17 and 18 is embedded in the insulators 15 and 16, respectively. These control elements, 17 and 18, by being made slightly resistive, can be heated to a temperature higher than elements 13 and 14 by means of an electrical current or, alternatively, the elements can be made hollow, and a heated fluid caused to flow through them.

As noted above, the shape of the control elements is not critical. However, in order not to create turbulence in the gas flow, the exposed surface of each of the elements 17 and 18 in contact with the gas is advantageously made to lie flush with the inside surface of insulators 15 and 16, respectively, and to conform to the circular configuration of the wavepath. Thus, each of the elements in FIG. 1 are segments of a hollow circular cylinder whose inside radius is $a$ and whose outside radius is less than $b$.

In the embodiment of the invention illustrated in FIG. 1, the two pairs of temperature control elements are symmetrically disposed about the inside of the cylinder and define a pair of essentially orthogonal directions. With reference to an $x$–$y$ coordinate system of axes, as represented by the arrows 19 and 20, the cold elements 13 and 14 lie essentially along the $y$ direction and the hot elements 17 and 18 lie essentially along the $x$ direction.

In operation, a gas, upon flowing through lens 1, is partially heated and/or partially cooled, by the temperature control elements, and radial temperature gradients are established across the wavepath. Relative to the gas temperature $T_a$ at the center of the wavepath (along the tube axis) the gas temperature increases in the $x$ direction to a maximum temperature $T_1$ immediately adjacent to the hot control elements 17 and 18, and decreases in the $y$ direciton, to a minimum temperature $T_2$ immediately adjacent to the cold elements 13 and 14. These radial temperature gradients are illustrated in FIG. 2, which is graphical representation of the variations in gas temperature as a function of the distance from the center of the wavepath along the $x$ direction and along the $y$ direction. FIG. 3 shows the corresponding variations in the refractive index as a function of distance from the center of the wavepath along the $x$ and $y$ directions.

As is disclosed in the above-identified copending applications, the temperature gradient along the $x$ direction acts upon the wave energy propagating along the inside of lens 1 as a positive, or converging lens. Similarly, the temperature gradient along the $y$ direction acts upon the wave energy as a negative, or diverging lens. Thus, a beam of optical wave energy propagating through lens 1 is subjected to converging lens action in the $x$ direction, and to diverging lens action in the $y$ direction under the influence of the temperature gradients produced by the lens illustrated in FIG. 1.

To produce alternating-gradient focusing, a second lens 2, substantially identical to lens 1, is located along the wavepath at a distance from lens 1 such that the center-to-center spacing between lenses is S. Lens 2 comprises a length of hollow tube 11' within which there is located a pair of temperature control elements 13' and 14' connected to its inner surface, two insulators 15' and 16', and a second pair of control elements 17' and 18' embedded in the insulators 15' and 16', respectively. Lens 2, however, is rotated ninety degrees relative to lens 1 so that the hot control elements 17' and 18' lie essentially along the $y$ axis direction, and the cold control elements 13' and 14' lie essentially along the $x$ axis direction. The resulting temperature gradients produced in lens 2 are the same as those described in connection with lens 1 except that in lens 2 the temperature gradient along the $x$ direction causes negative, or diverging lens action, and the temperature gradient along the $y$ direction causes positive, or converging lens action.

In the embodiment illustrated in FIG. 1, the two lenses 1 and 2 are separated by a section 3 of hollow pipe 21 whose inside radius is equal to the inside radii of lenses 1 and 2. Since the temperature gradients established in lens 1 is different than that established in lens 2, pipe 21 is advantageously made of a heat conducting material as this will tend to reduce the gas leaving lens 1 to a more uniform temperature prior to entering lens 2. It should be noted, however, that the length of pipe 21 is a matter of design and that in some instances pipe 21 can be omitted, in which case lens 1 and lens 2 would abut upon each other.

A good approximation of the variation in temperature across the wavepath in the direction of the $x$ and $y$ axes, as a function of the distance $r$ from the center of the wavepath, is given by $$T = T_a + \frac{\Delta T}{2}\left(\frac{r}{a}\right)^2 \quad (1)$$

where $T_a$ is the temperature at the center of the wavepath;
$\Delta T = T_1 - T_2$, the difference in temperature between the hot and cold temperature control elements;
$r$ is the distance to any point in question; and
$a$ is the distance from the center of the wavepath to the control elements.

The index of refraction $n$ can also be expressed as a square law function of the radius by $$n = n_a - \frac{\Delta n}{2}\left(\frac{r}{a}\right)^2 \qquad (2)$$

Using Equations 1 and 2, the equivalent focal length of a lens of length $d$ can be computed and is given by $$f = \frac{1}{(n_a - 1)}\left(\frac{a^2}{d}\right)\left(\frac{T_a}{\Delta T}\right) \qquad (3)$$

It is known that in an alternating-gradient focusing system, the center-to-center spacing S between adjacent lenses can vary between the limits $$0 \leq S \leq 2f \qquad (4)$$

Since the minimum value S can have in the gaseous lens system of FIG. 1 is $d$, the length of each lens, the permissible range of spacings is given by $$d < S < 2\left(\frac{1}{n_a - 1}\right)\frac{a^2}{d}\left(\frac{T_a}{\Delta T}\right) \qquad (5)$$

It is shown in the above-cited Bell System Technical Journal article that optimum spacing (i.e., minimum spot size) is given by $$S = 1.237f = 1.237\left(\frac{1}{n_a - 1}\right)\frac{a^2}{d}\left(\frac{T_a}{\Delta T}\right) \qquad (6)$$

The transmission path described hereinabove, and illustrated in FIG. 1, comprises a plurality of discrete thermal lenses, longitudinally distributed between the input and output ends of the system. In such a system there is an abrupt transition in the temperature gradients established in adjacent lenses, mitigated, to some extent, by the section of uniform pipe between lenses. Since the gas is continuously being alternately heated and cooled as it flows along the wavepath, such a system requires a substantial amount of power for its operation.

In a second embodiment of the invention this power requirement is substantially reduced by the use of helical temperature control elements and by imparting a helical motion to the gas. By this arrangement, the temperature gradients, once established are maintained essentially constant. With respect to the electromagnetic wave energy, however, the temperature gradient appears to reverse due to the helical configuration and motion of the gas, as will be explained more fully with reference to FIG. 4.

Basically, the transmission path shown in FIG. 4 is very similar to that illustrated in FIG. 1, except that it is a continuous structure, as will be explained hereinbelow. Thus, a cross-sectional view of the transmission path discloses, as before, a hollow cylindrical tube 40, within which there are located two pairs of symmetrically disposed temperature control elements 41–42 and 43–44. The cold elements 41 and 42 are either fabricated as an integral part of the tube, as shown, or they can be separate members, connected to the inside surface of tube 40. As in FIG. 1, elements 41 and 42 and tube 40 are made of heat conducting materials.

The hot elements 43 and 44 are embedded in insulating members 45 and 46, respectively.

In the embodiment of FIG. 1, each of the control elements, and each of the insulating members, extend linearly along the wavepath. By contrast, in the embodiment of FIG. 4, each of these elements and members is helically wound about the inside of tube 40. Thus, the elements 41 and 42 which extend along the y direction at the particular cross section of wavepath illustrated in FIG. 4 extend in the x direction at a location along the wavepath equal to one-quarter of the pitch length of the helix described by the elements. Similarly, elements 43 and 44, which are shown along the x direction, are rotated through ninety degrees and lie along the y direction at the location equal to one-quarter of the pitch length away.

In order that the relative position of the gas and the control elements remains constant as the gas flows along the path, a helical motion is imparted to the gas by means of the helical vanes 47, 48, 49 and 50. Each vane extends radially into the gas stream as much as possible without substantially interfering with the optical beam propagating therethrough, and extends longitudinally along tube 40 with the same pitch as the control elements. The vanes, which have a nominal thickness, can be located anywhere within the tube where they can function in the manner described. For convenience, and so as not to interfere with the operation of the control elements, the vanes are shown mounted symmetrically between control elements. Advantageously, the vanes are made of a heat insulating material so as not to disturb the thermal gradients established by the temperature control elements.

In operation, transverse temperature gradients are established in the gas flowing within tube 40 under the influence of the temperature control elements. At the particular cross section depicted in FIG. 4, the temperature gradients are as shown in FIG. 2. However, because of the helical shape of the control elements and the corresponding helical motion of the gas, induced by vanes 47, 48, 49 and 50, the directions along which these temperature gradients are established rotate about the longitudinal axis. Thus, at a location further along the wavepath, equivalent to one-quarter of the pitch length of the helical vanes and of the control elements, the hot elements 43 and 44 are rotated ninety degrees and are aligned along the y direction. In like manner the cold elements 41 and 42 are also rotated ninety degrees and are aligned along the x direction. To the electromagnetic wave energy propagating along the wavepath, the lens action produced has changed from maximum convergent to maximum divergent along the x direction, and from maximum divergent to maximum convergent along the y direction. This reversal in lens action repeats regularly every quarter of the pitch length. Thus, the change from convergent to divergent, which occurs gradually along the wavepath, produces the equivalent of an alternating-gradient focusing lens system. It will be noted, however, that this occurs without the necessity of producing a reversal in the temperature gradients in the gas. The gas, which flows along a helical path, retains essentially a fixed temperature distribution at all locations.

In addition to the reduction in power required in such a system, the helical motion also reduces the distortion produced by the action of gravity upon the gas as explained in the copending application by D. Marcuse and W. H. Steier, Serial No. 450,121, filed April 22, 1965, and assigned to applicant's assignee.

Figure 5:
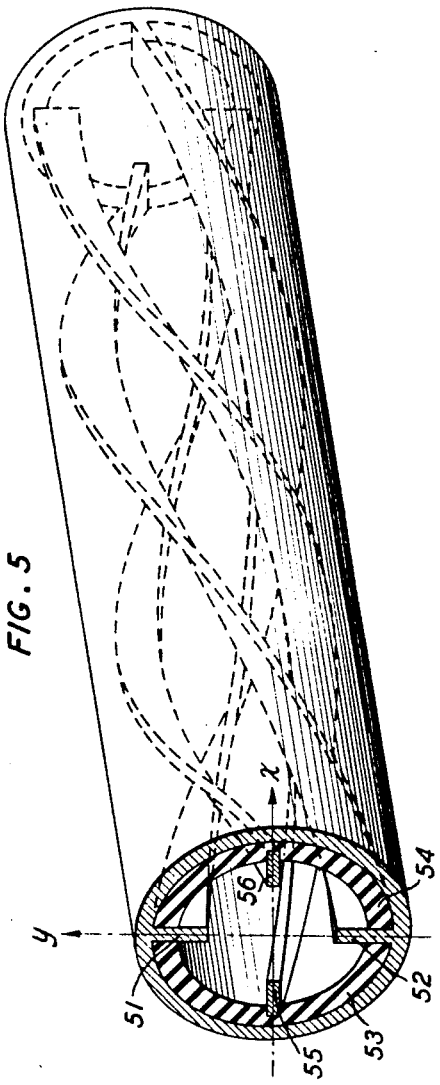

FIG. 5 is a modification of the embodiment illustrated in FIG. 4, in which the functions of the temperature control elements and the vanes are merged into a single structure. More particularly, the cold temperature control elements 51 and 52 extend radially inward beyond the insulating members 53 and 54, as do the hot temperature control elements 55 and 56. In this way they serve both to establish the desired temperature gradients and to impart a helical motion to the gas.

In the embodiment of FIG. 4, and the alternate embodiment of FIG. 5, the temperature control elements can be smaller than those of FIG. 1 since they act upon the gas continuously over the entire length of the wavepath in a consistent manner. In the embodiment of FIG. 1, the elements must act to reverse the temperature gradient in the gas as it enters each lens. In the latter embodiment, the size of the elements depends upon the size of the wavepath and the corresponding volume of gas that must be heated, its specific heat, the rate of gas flow, and other factors.

By approximating the continuous transmission paths of FIG. 4 and FIG. 5 as comprising a plurality of alternately converging and diverging lenses spaced apart a distance equal to one-quarter of the helical pitch length, the optimum pitch length L is given as $$L \approx \frac{8a}{\sqrt{1.25\pi}} \sqrt{\frac{T_a}{\Delta T(n_a-1)}} \quad (7)$$

where the symbols are as given hereinabove.

In a thermal gaseous lens, using a single gas, focusing is the result of the density gradient produced by the thermal gradient established across the gas. This focusing effect can be enhanced, however, by using a mixture of a light and heavy gas, as explained in the above-mentioned copending application by K. B. McAfee, Jr.

In all cases it is understood that the above-described arrangements are illustrative of but a small number of the many possible specific embodiments which can represent applications of the principles of the invention. For example, in the embodiments of the invention described, the cold temperature control elements are connected to the surrounding tubing and assume the temperature of the tubing. It is obvious, however, that all the control elements can be insulated from the tubing and their temperatures controlled independently of each other and of the ambient temperature. In such an arrangement the tubing need not be made of a heat conducting material. Thus, numerous and varied other arrangements can readily be devised in accordance with these principles by those skilled in the art without departing from the spirit and scope of the invention.

What is claimed is:

1. Thermal gaseous electromagnetic waveguiding means comprising:
   a hollow enclosure;
   a longitudinally flowing gas within said enclosure;
   temperature control elements symmetrically distributed about the inside of said enclosure and extending longitudinally therealong;
   the temperatures of said elements being such as to establish along said waveguiding means a radially increasing temperature gradient within said gas along a first direction;
   and simultaneously to establish a radially decreasing temperature gradient within said gas along a second direction perpendicular to said first direction.

2. The lens according to claim 1 wherein said control elements extend linearly along said enclosure in a direction parallel to the direction of gas flow.

3. The lens according to claim 1 wherein said control elements are helically wound along the inside of said enclosure.

4. A waveguide for electromagnetic wave energy comprising a plurality of longitudinally distributed thermal gaseous lenses;
   each of said lenses comprising a length of hollow cylindrical tube;
   a longitudinally flowing gas within each tube;
   a first pair of temperature control elements diametrically disposed on opposite sides of each lens for establishing a radially increasing temperature gradient across said gas along a first direction;
   and a second pair of temperature control elements diametrically disposed on opposite sides of each lens for establishing a radially decreasing temperature gradient across said gas along a second direction perpendicular to said first direction;
   adjacent lenses of said waveguide rotated relative to each other such that the first direction of each lens is perpendicular to the first direction of the next adjacent lens.

5. A thermal gaseous electromagnetic waveguide comprising an elongated, hollow cylindrical tube;
   a longitudinally flowing gas within said tube;
   four symmetrically disposed temperature control elements helically wound about the inside of said tube;
   said elements arranged in pairs with each pair comprising two diametrically opposite elements;
   the first of said pairs of elements being heated to a temperature different than the temperature of the other of said pairs;
   and means for imparting a helical motion to said gas as it flows along said tube.

6. The waveguide according to claim 5 wherein said helical motion is imparted to said gas by means of separate vanes.

7. The waveguide according to claim 5 wherein said helical motion is imparted to said gas by said control elements.

References Cited

Marcuse et al., "Analysis of a Tubular Gas Lens," The Bell System Technical Journal, vol. XLIII, No. 4, part 2, July 1964, pp. 1759–1782.

JOHN K. CORBIN, *Primary Examiner.*